United States Patent [19]

Mistrick et al.

[11] 4,348,435

[45] Sep. 7, 1982

[54] PRIMED MULTIPLE GLAZED UNITS FOR CURTAINWALL SYSTEMS

[75] Inventors: George R. Mistrick; George H. Bowser, both of Allegheny Township, Allegheny County; Renato J. Mazzoni, Creighton, all of Pa.

[73] Assignee: PPG Industries, Inc., Pittsburgh, Pa.

[21] Appl. No.: 131,581

[22] Filed: Mar. 19, 1980

[51] Int. Cl.³ .......................... E06B 3/24; B32B 17/10; B32B 25/18; B32B 27/30

[52] U.S. Cl. ........................................ 428/34; 52/788; 52/790; 156/109; 156/307.3; 156/307.5; 156/334; 427/387; 427/389.7; 427/393.5; 427/407.2; 427/412.1; 427/413; 428/429; 428/441; 428/442; 428/447; 428/451; 428/494; 428/517; 428/520; 428/521; 428/522

[58] Field of Search ................. 428/451, 494, 34, 429, 428/441, 447, 517, 520, 442, 521, 522; 156/109, 334, 307.3, 307.5; 52/788, 790; 427/407.2, 412.1, 413, 372.2, 387, 393.5, 389.7

[56] References Cited

U.S. PATENT DOCUMENTS 2,989,419 6/1961 Zamusen .
3,026,229 3/1962 Wilcox ............................... 156/309
3,398,043 8/1968 Youngs .............................. 428/447
3,477,901 11/1969 Keil ..................................... 428/447
3,542,585 11/1970 Heit ..................................... 428/447
3,686,731 8/1972 Koori ................................... 428/447
3,749,617 7/1973 Fountain ................................ 156/3
3,919,023 11/1975 Bowser ................................. 428/34
3,959,533 5/1976 Kitaj .................................... 428/447
4,000,347 12/1976 Ranney ............................... 428/419
4,046,945 9/1977 Baxmann ............................. 428/451
4,059,469 11/1977 Mattimoe ............................ 428/451
4,149,348 4/1979 Pyzewski .............................. 428/34
4,170,585 10/1979 Motegi ................................ 428/451
4,215,164 7/1980 Bowser ................................ 156/109

*Primary Examiner*—Ellis P. Robinson
*Attorney, Agent, or Firm*—Donald Carl Lepiane; Lee Patch

[57] ABSTRACT

An adhesion-promoting primer, e.g., an emulsion polymer, is employed to bond organic elastomers to silicone elastomer adhesives. A multiple glazed unit having an organic elastomer sealant about its periphery is mounted into a curtainwall system by first coating the exposed organic elastomer sealant with a suitable primer before bonding the multiple glazed unit to the curtainwall system with silicone elastomer adhesive.

15 Claims, 4 Drawing Figures

PRIMED MULTIPLE GLAZED UNITS FOR CURTAINWALL SYSTEMS

FIELD OF THE INVENTION

This invention relates to improvements in multiple glazed units and curtainwall glazing systems constructed therewith, and more particularly to improving adhesion between organic elastomers used in sealing multiple glazed units and silicone elastomer adhesives used to secure the units in a curtainwall system.

Discussion of the Technical Problems

It is recognized to construct a curtainwall system by mounting multiple glazed units on rigid members, e.g., transoms and/or mullions. The multiple glazed units normally include a plurality of sheets, e.g., glass sheets, metal sheets etc., spaced apart to provide an air space therebetween. The air space is hermetically sealed against air, dust, and water vapor by a sealant. The sealant preferably also has satisfactory temperature resistance and high strength characteristics to maintain the structural integrity of the multiple glazed unit. Further, ease of application of the sealant is desirable to provide production economy of multiple glazed units. Hot melt butyl sealants are commonly selected for sealing the dead air space because they have high adhesion properties, low water vapor transmission and ease of application.

Although the hot melt butyl sealants are acceptable for constructing multiple glazed units, they are not normally acceptacle for glazing because they do not have the required adhesive strength. Thus, it is necessary to employ a different adhesive with superior strength and temperature resistant characteristics, e.g., a silicone elastomer adhesive, for the glazing installation.

Although the silicone elastomer adhesives are acceptable for glazing they do not always readily adhere to organic elastomer materials and methods are employed to avoid this adherence problem. For example, U.S. Pat. No. 3,398,043 teaches a method of bonding silicone elastomers in the solid or foam data to organic elastomers. A bonding mixture of isocyanate and vulcanizable silicone elastomer is applied to one or both of the surfaces to be bonded and the surfaces urged toward one another until the bonding mixture cures. This method has limited usefulness because the two elastomers to be bonded are in a solid or foam state and pressure is applied for a time sufficient for the bonding mixture to cure.

U.S. Pat. No. 3,749,617 teaches a method whereby an organic elastomer is bonded to an uncured silicone elastomer by reacting the surface of the organic elastomer with a peroxide, washing the peroxide from the organic elastomer surface, drying the surface, and maintaining the two elastomers in contact, e.g., in a heated environment, until the silicone elastomer cures. Although this method improves bonding between the two elastomers, it has limitations. For example, the peroxide is applied to and maintained upon the organic elastomer for a period of time and thereafter removed. After the peroxide treatment, the organic elastomer is washed and dried. As can be appreciated, this process of removal, washing and drying is time-consuming and particularly impractical if an organic elastomer has a tacky exterior surface, e.g., hot melt butyl sealants. Furthermore, this method generally requires extended time periods, or elevated temperature, or both, to produce optimum curing of the silicone elastomer.

It would be advantageous to have a method by which organic elastomers are bonded to silicone elastomers while avoiding the difficulties of the above-mentioned techniques.

SUMMARY OF THE INVENTION

In general, this invention relates to a method of improving the bond between silicone elastomer adhesives and organic elastomers by use of a primer adherent to both the silicone elastomer adhesives and organic elastomers. A coating of the primer is applied to the organic elastomer in any convenient manner, permitted to dry, and then contacted to uncured silicone elastomer adhesive. This method of interposing a suitable primer layer eliminates the problem of adhesive failure between a silicone elastomer adhesive and an organic elastomer.

This invention also relates to an improved multiple glazed unit, and methods for producing same. More particularly, this invention relates to a multiple glazed unit having a pair of sheets spaced from one another by a spacer. The space is sealed with an organic elastomer having an exposed surface which is to subsequently be adhered to a rigid member, e.g., a transom of a curtainwall system, byy a silicone elastomer adhesive. A primer is applied to the exposed surface of the organic elastomer prior to adhering the unit with the silicone elastomer adhesive.

Further, this invention relates to an improved method of mounting multiple glazed units to a rigid member, where the units have an exposed organic elastomer surface, and are to be secured to the rigid member by a silicone elastomer adhesive. A primer layer is applied to and dried upon the exposed surface of the organic elastomer prior to applying the silicone elastomer adhesive to the unit to secure same to the rigid member. Rigid members utilized could include an adjacent multiple glazed unit, mullions or transoms of a curtainwall system, or the peripheral edge of a fenestration. Use of the present invention provides a structure which is stronger and more water-tight than that obtained in the absence of use of this invention because the primer is more adherent to both the organic elastomer and silicone elastomer adhesive than the organic elastomer and silicone elastomer adhesive are to one another.

DESCRIPTION OF THE INVENTION

Figure 1:
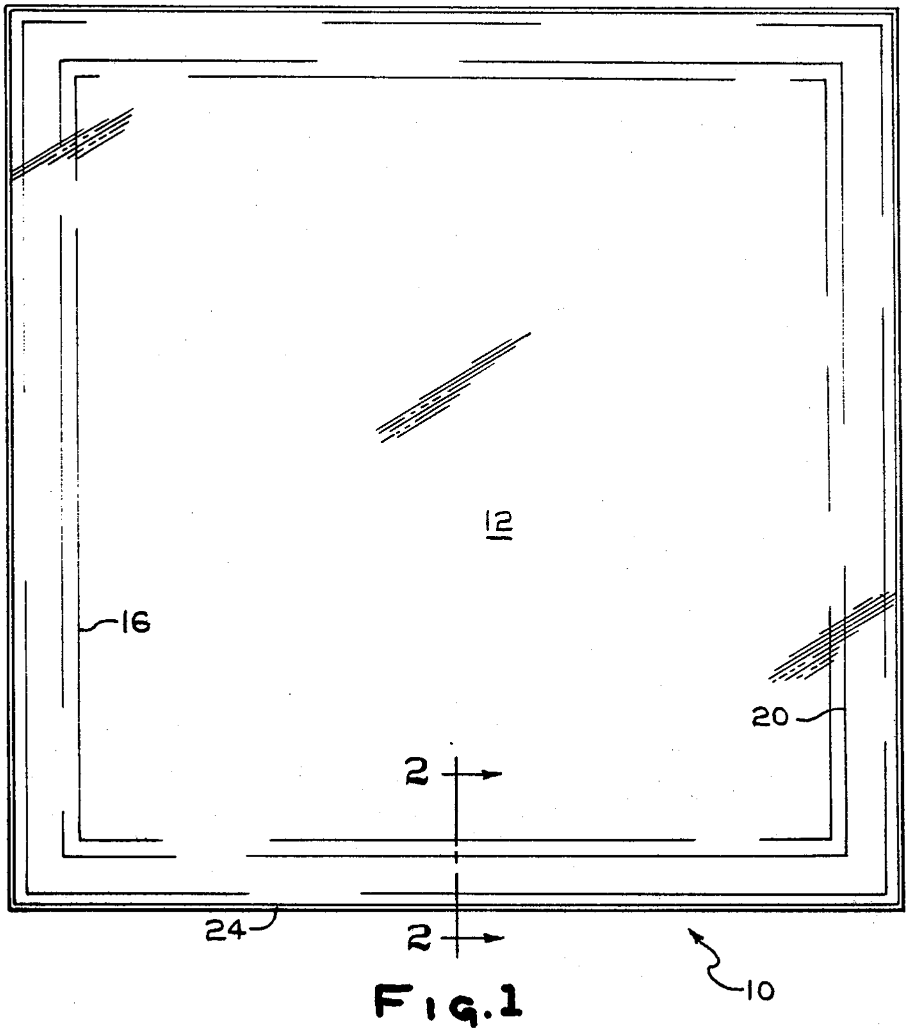
FIG. 1 is a front elevated view of a multiple glazed unit constructed in accordance to the teachings of the invention.

In general, the invention relates to improving the bond between a silicone elastomer adhesive and an organic elastomer by a primer or intermediate layer adherent to the silicone elastomer adhesive and the organic elastomer. As used herein, the term "silicone elastomer adhesive" is defined as a silicone elastomer having an adhesion promoter therein. Examples of silicone elastomer adhesives that may be used in the practice of the invention, but not limiting thereto, are taught on pages 365–370 of the 1977 Blue Book, published by Bill Communications, Inc. of New York, which teachings are hereby incorporated by reference. As used herein, the term "organic elastomer" includes natural or synthetic elastomers such as, but not limited to, silicone elastomers; precured materials of the type taught in U.S. Pat. No. 2,974,377; thermal plastic materials of the type taught in Handbook of Adhesives, Rinehold Publishing Corporation, 1962, Chapter 36, entitled "Hot Melt Adhesives"; and room temperature curable materials of the type taught in U.S. Pat. No. 3,076,777. The teachings of the above patents and handbook are hereby incorporated by reference. The term "primer" or "intermediate layer" as used herein is defined as a coating applied to a surface of the organic elastomer prior to the application of the silicone elastomer adhesive to improve the adhesion between the silicone elastomer adhesive and the organic elastomer. Materials that may be used as a primer in the practice of the invention, but not limited thereto, are emulsion polymers such as an acrylic emulsion polymer sold by the Rohm & Haas Company under the trademark Rhoplex AC-490; an ethylene copolymeer sold by E. I. duPont DeNemours & Co., Inc., Wilmington, Delaware, known as Elvace 1875; a hydrocaron resin emulsion polymer sold by Polymeric Systems Incorporated of Pottstown, Pennsylvania and known as Polymeric VB711; an acrylic latex polymer sold by Spraylat Corp. under the name Form Strip TR-4995; and an acrylic emulsion polymer sold by Dutch Boy Paints and known as Interior Latex Enamel Undercoater and Sealer (73-01 White). The invention is not limited to the above materials for use as primers and any material that acts as a primer may be used in the practice of the invention.

The structure and shape of the organic elastomer surface is not limiting to the present invention. Application of the primer upon the organic elastomer surface may be accomplished by brushing, rolling, spraying, or any other convenient technique and is not limiting to the invention.

To determine if a material may be used as a primer in the practice of the invention, the following test may be used. The organic elastomer to be joined to the silicone elastomer adhesive is prepared as a substrate. Thereafter, three beads of the selected silicone elastomer adhesive are conveniently applied on the substrate. After the beads of the adhesive have cured, each is individually and manually peeled from the substrate to test the interelastomeric adhesion by observing the failure mode. The failure mode normally is either a cohesive failure or an adhesive failure. A cohesive failure is the internal rupture of the silicone elastomer adhesive or the organic elastomer. An adhesive failure is a failure other than a cohesive failure and is normally separation at an interface.

If a cohesive failure occurs in the above test a primer is normally not required. If an adhesive failure occurs in the above test, the test is repeated with the following additional step. Prior to applying the beads of the silicone elastomer adhesive to the substrate, the material being tested as a primer is conveniently applied to the substrate. After the material being tested as a primer dries, the beads of the silicone elastomer adhesive are applied to the substrate, allowed to cure and the peel test repeated. If the peel test shows a cohesive failure the material is acceptable as a primer. If the peel test results in an adhesive failure with improved bonding the material may be considered acceptable as a primer. If the peel test has an adhesive failure with no improved bond the material being tested is unacceptable as a primer. If the adhesive failure occurs at the interface between the material being tested as a primer and the organic elastomer, the material being tested may be acceptable as a primer for use with the silicone elastomer adhesive and an organic elastomer other than the one used in the test. If the adhesive failure is at the interface between the material being tested and the silicone elastomer adhesive the converse would be true.

The following tests, which are similar to those described above, were conducted to provide a system, e.g., a silicone elastomer adhesive, an organic elastomer and a primer, for use in the construction of a curtainwall system having multiple glazed units.

TEST I

Figure 2:
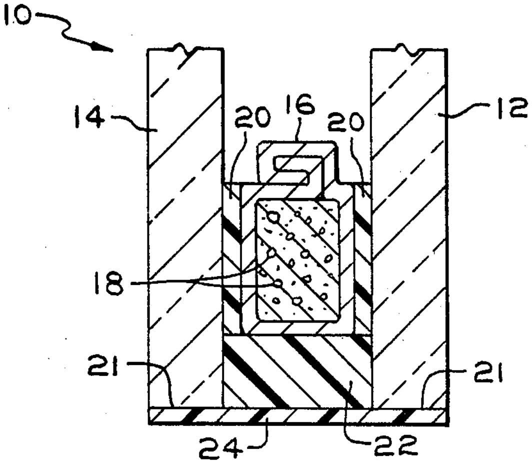
FIG. 2 is a view taken along lines 2—2 of FIG. 1.

Six multiple glazed units 10 similar to those shown in FIGS. 1 and 2 were constructed. Each of the units included a pair of glass sheets 12 and 14 each having a width of about 14 inches (35 centimeters), a length of about 20 inches (50 centimeters) and a thickness of about ¼ inch (0.6 centimeter). The glass sheets 12 and 14 were separated by a hollow galvanized steel spacer 16 of the type taught in U.S. Pat. No. 2,838,810. In FIGS. 1 and 2 dessicant 18 is contained in the spacer 16; however, in the construction of the units for Test I no dessicant was employed. The spacer 16 is secured to adjacent marginal edge portions of the sheets 12 and 14 by a layer 20 of room temperature flowable butyl adhesive similar to Component A of the sealant taught in U.S. Patent Application Ser. No. 584,793, filed on June 9, 1975 in the name of George H. Bowser and entitled "Multiple Glazed Unit" now U.S. Pat. No. 4,215,164. The spacer 16, having a width of about ½ inch (1.2 centimeters), is recessed about ⅛ inch (0.3 centimeter) from adjacent peripheral edge portions 21 of the sheets 12 and 14 to provide a peripheral channel 22, as shown in FIG. 2. The peripheral channel 22 was conveniently filled with Fuller HM 1081 hot melt butyl sealant sold by the H. B. Fuller Company.

With continued reference to FIG. 2, a layer 24 of an acrylic emulsion polymer sold by Rohm and Haas Company under the trademark Rhoplex AC-490, was conveniently applied to the peripheral edge portions of three units and allowed to dry at toom temperature. After the acrylic emulsion polymer layer dried, one primed unit and one unprimed unit had a bead of a silicone elastomer adhesive sold by Rhodia, Inc. under the trademark Rhodorsil 3B applied to the peripheral edge portions; one primed and one unprimed unit had a bead of silicone elastomer adhesive sold by General Electric Company under the tradmark GE 1200 (clear) applied to the peripheral edge portions and the remaining units had a bead of silicone elastomer adhesive sold by Dow Corning Company under the trademark Dow Corning 781 (bronze) applied to the peripheral edge portions.

All six units were allowed to cure at room temperature for seven days. The six units were, thereafter, placed in an oven having circulating air heated to a temperature of about 158±5° F. (70±2° C.) for 19 days to accelerate any degradation due to chemical reaction between the acrylic emulsion polymer, the silicone elastomer adhesives and the organic elastomer being tested. At the end of 19 days the units were removed and allowed to cool to room temperature. Thereafter each bead of the silicone elastomer adhesives was manually pulled to determine whether the failure mode was cohesive or adhesive. The unprimed units using Dow Corning 781 and GE 1200 silicone elastomer adhesives had adhesive failures and the remaining four units had cohesive failures. The surfaces of the materials were also visually observed to determine if any degradation occurred due to chemical reaction between the acrylic emulsion polymer, the silicone elastomer adhesives and the organic elastomer being tested. No degradation was visually observed on the units. Of interest is the result of the primed and unprimed units having the Rhodorsil 3B silicone elastomer adhesive having cohesive failures. This would indicate that the acrylic emulsion polymer of Test I did not improve or detrimentally affect the bond between the Rhodorsil 3B silicone elastomer adhesive and the hot melt sealant.

TEST II

Test II was performed to determine if the results obtained in Test I, were repeatable as to failure mode when Fuller HM 1081 hot melt butyl sealant is used with Dow Corning 781 silicone elastomer adhesive.

Three beads of Dow Corning 781 adhesive were conveniently applied to a substrate of Fuller HM 1081 sealant. After the beads cured, each bead was subjected to the peel test. The failure mode was adhesive, substantiating the results of Test I.

TEST III

Test III was performed to determine if the results of Test I were repeatable as to failure mode when Fuller HM-1081 hot melt butyl sealant is used with Rhodorsil 3B adhesive. Two multiple glazed units of generally the same size and configuration as used in Test I were prepared. A coating of Rhoplex AC-490 acrylic emulsion polymer was applied to one long and one short side of the peripheral edge of both units and allowed to dry at room temperature. The other long and short side of both units were left unprimed. Three eight inch beads of Rhodorsil 3B silicone elastomer adhesive were applied to the primed and unprimed peripheral edge portions of each unit. The silicone was allowed to cure at room temperature for seven days.

Both units were placed in a circulating oven as was done in Test I. At the end of 19 days, the units were allowed to cool to room temperature. Thereafter, each bead of silicone adhesive was manually pulled. All six silicone beads attached to the unprimed surfaces failed adhesively while those attached to the primed surfaces failed cohesively. The results of Tests I and III as to the use of the primer were the same. However, the results between Tests I and III were different in that in Test III the unprimed side failed adhesively. The reasons for this difference are not known, however, Test III does illustrate consistent results while practicing the present invention.

TEST IV

In Test IV, 24 units similar to those of Test I were constructed. The units for this test had a width of about 2 inches (5.1 centimeters), a length of about 10 inches (25.4 centimeters), and a thickness of about 1 inch (2.54 centimeters). A layer of acrylic emulsion polymer sold by Rohm & Haas Co. under the trademark Rhoplex AC-490 was brushed on the peripheral edge portions of 12 units hereinafter referred to as primed units. The remaining 12 units are hereinafter referred to as unprimed units. A bead of GE 1200 (clear) silicone elastomer adhesive was conveniently applied to the peripheral edge portions of six primed and six unprimed units and a bead of a Dow Corning 781 silicone elastomer adhesive was conveniently applied to the peripheral edge portions of the remaining units. Each bead had a width of approximately $\frac{7}{8}$ inch (2.22 centimeter). The silicone elastomer beads were cured at room temperature, afterwhich a peel test was performed on about a 2 inch (5.1 centimeter) length of the bead. The results of the initial test are that the 12 unprimed units had an adhesive failure and the 12 primed units had cohesive failure.

The 24 units were then submerged for ten days in a water bath heated to a temperature of about 140° F. (60° C.). Immediately upon removal from the bath a peel test was performed on an additional 2 inch (5.1 centimeter) length of each bead. The 12 unprimed units had adhesive failure, and the 12 primed units had moderate to slight adhesive failure. These results indicate that submersion in a heated water bath had a slight to moderate affect on the primer. The units were set at room temperature for 24 hours to dry and thereafter the peel test repeated on an additional 2 inch (5.1 centimeters) bead length. The unprimed units had adhesive failure; the six primed units having the Dow Corning 781 silicone elastomer adhesive had cohesive failure; and the six primed units having the GE 1200 (clear) silicone elastomer adhesive had slight to moderate adhesive failure.

The 12 units having the GE 1200 (clear) silicone elastomer adhesive were heated at about 140° F. (60° C.) for about five hours to determine if drying the units would improve the bond and to determine if the adhesive failure was due to excess moisture. The heated units were cooled to room temperature afterwhich a peel test was performed. The unprimed units had adhesive failure; two of the primed units had cohesive failure and the remaining four primed units had slight to moderate adhesive failure.

Conclusions that may be drawn from Test IV are (1) that the acrylic emulsion polymer sold under the trademark Rhoplex AC-490 improved the bond between GE 1200 (clear) and Dow Corning 781 silicone elastomer adhesives and hot melt butyl sealants, and (2) that submersion in heated water over long periods of time may have adverse affect on the bond.

TEST V

The following test was performed to determine additional organic elastomers and silicone elastomer adhesives that can be used in the practice of the invention.

Three substrates of an acrylic elastomer sold by American Cyanamide Company under the trademark Cyanacrylic were provided. On one substrate three beads of Rhodorsil 3B silicone elastomer adhesive were conveniently applied, on another substrate three beads of Dow Corning 781 silicone elastomer adhesive were conveniently applied, and three beads of GE 1200 (clear) silicone elastomer adhesive were conveniently applied to the last substrate. After the silicone elastomer adhesive beads cured they were each subjected to a peel test. The test results showed that the GE 1200 (clear) and Dow Corning 781 silicone elastomer adhesives failed cohesively and the Rhodorsil 3B silicone elastomer adhesive failed adhesively. The results of the test indicated that Rhodorsil 3B silicone elastomer adhesives and organic elastomers similar to the type sold under the trademark Cyanacrylic are candidates for primers to improve adhesion therebetween.

TEST VI

This test was conducted to verify and expand upon the data collected in Tests I, II, and III, as to the bonding performance of selected silicone elastomer adhesives and Fuller HM-1081 hot melt sealant when used with or without various candidate primer materials.

In Test VI, six 11 inch (28 cm.)×2 inch (5.1 cm.)×3/16 inch (0.48 cm) beads of Fuller HM-1081 hot melt sealant were applied to each of three 14 inch (35.6 cm)×20 inch (51 cm.)×⅛ inch (0.32 cm.) glass specimens. One-half of each bead (5½ inches) was left unprimed while the other half of the three sets of six beads was primed by brushing with one of the following six primer candidates, which were: Polymeric VB-711 hydrocarbon resin emulsion polymer sold by Polymeric Systems Inc. of Pottstown, Pennsylvania; acrylic latex sold by B. F. Goodrich Company under the tradename Hycar 2601; ethylene acetate copolymer sold under the tradename Elvace 1875 by E. I. duPont de Nemours & Co., Inc., Wilmington, DE.; acrylic emulsion polymer sold by Rohm & Haas Company under the trademark Rhoplex AC-490; an acrylic emulsion polymer known as Interior Latex Enamel Undercoater and Sealer (73-01 White) sold by Dutch Boy Paints; and an acrylic latex polymer sold by Spraylat Corporation under the name Form Strip TR-4995.

Each glass specimen containing the six hot melt beads was primed identically and allowed to dry at room temperature (approximately 70° F. and 50% relative humidity). Two beads of Rhodorsil 3-B silicone elastomer adhesive were applied to each bead of Fuller HM-1081 hot melt on one glass specimen. Two beads of GE 1200 silicone elastomer adhesive were applied to each hot melt bead on the second glass specimen and two beads of Dow Corning 781 silicone adhesive were applied to the hot melt beads on the third glass specimen.

The silicone adhesive beads were allowed to cure and peel tests were conducted on the primed and unprimed hot melt surfaces. All silicone adhesive beads from each of the three types of silicone adhesives employed failed adhesively at the unprimed hot melt surfaces. The results of the adhesion of the silicone adhesive beads to the primed hot melt surfaces are on Table I. The Hycar 2601 acrylic latex polymer failed adhesively to the Fuller HM-1081 hot melt sealant with all three silicone adhesives. With all the other primer candidate materials, the Dow Corning 781 and Rhodorsil 3-B silicone adhesives failed 100% cohesively, while in the GE 1200 testing, the hot melt substrate failed cohesively. This is attributed to the slightly higher ultimate tensile strength of the GE 1200 silicone adhesive.

Test VI indicates that Rhoplex AC-490 polymer, Polymeric VB-711 polymer, Elvace 1875 polymer, Interior Latex Enamel Undercoater and Sealer polymer, and Form Strip TR-4995 polymer are suitable for use as primers between Fuller HM-1081 hot melt sealants and the tested silicone adhesives. It further indicates that Hycar 2601 polymer is unsuitable for primer use in the present application.

TABLE I

PEEL TEST RESULTS
SILICONE CONSTRUCTION ADHESIVES TO PRIMED AND UNPRIMED FULLER HM-1081 HOT MELT SEALANT

| | SILICONE ADHESIVES | | |
|---|---|---|---|
| Primer | Dow Corning 781 | General Electric 1200 | Rhodorsil 3-B |
| Control - No Primer | 100% adhesive failure | 100% adhesive failure | 100% adhesive failure |
| Rhoplex AC-490 | 100% cohesive failure of the silicone sealant | 100% cohesive failure of the hot melt sealant | 100% cohesive failure of the silicone sealant |
| Hycar 2601 | 100% adhesive failure between the primer and hot melt | 100% adhesive failure between the primer and hot melt | 100% adhesive failure between the primer and hot melt |
| VB-711, Black | 100% cohesive failure of the silicone sealant | 100% cohesive failure of the hot melt sealant | 100% cohesive failure of the silicone sealant |
| Elvace 1875 | 100% cohesive failure of the silicone sealant | 100% cohesive failure of the hot melt sealant | 100% cohesive failure of the silicone sealant |
| Spraylat TR-4995 | 100% cohesive failure of the silicone sealant | 100% cohesive failure of the hot melt sealant | 100% cohesive failure of the silicone sealant |
| Dutch Boy Interior Latex Enamel Undercoater and Sealer (73-01 White) | 100% cohesive failure of the silicone sealant | 100% cohesive failure of the hot melt sealant | 100% cohesive failure of the silicone sealant |

TEST VII

Figure 4:
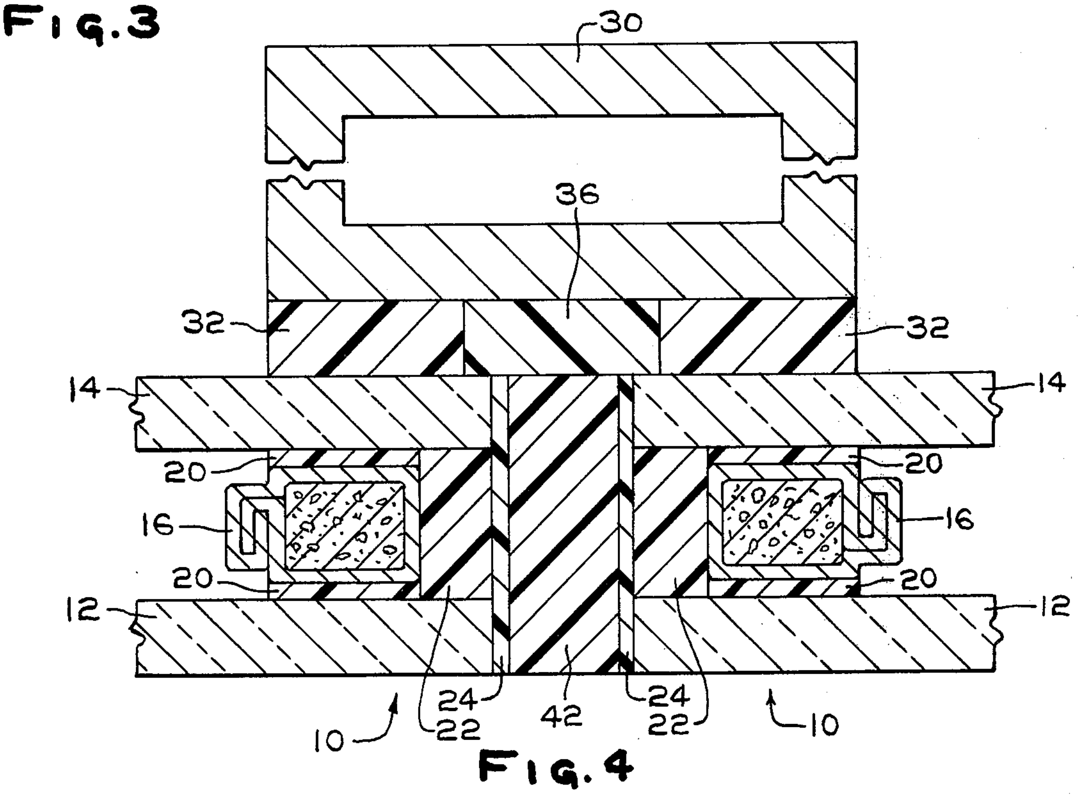
FIG. 4 is a view taken along lines 4—4 of FIG. 3.

This test was performed to determine if selected primers adversely affect the bond between silicone elastomer adhesives and glass. As shown in FIG. 4, the units 10 are held in position against structural members, e.g. mullion 30, by a layer 32 of silicone elastomer adhesive. If the use of the primer reduces or degrades the bond between the silicone elastomer adhesives and the glass sheets, care must be exercised to assure that the primer is only applied to the exposed hot melt butyl sealant. Otherwise, although the primer improves the bond between the silicone elastomer adhesives and hot melt butyl sealant; it may diminish the overall strength of the curtainwall system by reducing the bond between silicone elastomer adhesives and glass.

In Test VII twelve glass substrates were divided into four groups of three substrates each. One group had a major surface primed by brushing with Polymeric VB 711 polymer sold by Polymeric Systems Inc. of Pottstown, Pennsylvania, the second group was primed by brushing with HyCar 2601 acrylic latex polymer; the third group was primed by brushing with Elvace 1875 ethylene acetate copolymer and the fourth group was primed by brushing with Rhoplex AC-490 acrylic emulsion polymer.

Three beads of Rhodorsil 3B silicone elastomer adhesive were applied to one substrate of each group; three beads of Dow Corning 781 silicone elastomer adhesive were applied to one substrate of each group, and three beads of GE 1200 silicone elastomer adhesive were applied to a substrate of each group. The silicone beads were allowed to cure and peel tests were conducted. The failure mode of the peel tests was adhesive at the glass-primer interface for the samples having the Hycar 2601 acrylic latex polymer and the remaining failures were cohesive failures. The results of the peel test of Test VII indicate that Hycar 2601 acrylic latex polymer detrimentally affects adhesion between the silicone adhesives and glass. Therefore, if acrylic latex emulsions of the type sold under the tradename Hycar 2601 are used as primers, care should be exercised not to apply same to a glass surface which will subsequently receive the silicone elastomer adhesive.

TEST VIII

A lap shear test was performed to determine quantitative values as to the effect of using a primer with a selected silicone elastomer adhesive and glass, for the reasons discussed in TEST VII.

The lap shear test was conducted according to ASTM Test No. D-1002 entitled Strength Properties of Adhesives In Shear by Tension Loading (Metal-to-Metal), except that individual specimen plates of ⅛ inch (0.3 centimeter) thick glass were used and the specimens were pulled at a rate of two inches (5.1 centimeters) per minute. The results of the lap shear tests are on Table II.

TEST IX

An air-tight chamber was constructed having one major surface formed of a curtainwall system having three multiple glazed units. The units were similar in construction to unit 10 shown in FIGS. 1 and 2 and discussed in Test I, except that the glass sheets were made of heat-strengthened glass and the spacer 16 was filled with dessicant 18. Each of the units had a height as mounted of about 8 feet (2.4 meters) and a length as mounted of about 5 feet (1.5 meters) and a thickness of about 1 inch (2.54 centimeters). Silicone cleats were applied to the spacer and adjacent glass sheets to prevent spacer sag. The cleats extended along each of the 8 foot sides and two 12 inch cleats applied on the other sides of each unit. The silicone cleat was between the primary and secondary seal and is similar to those taught in U.S. Patent Application Ser. No. 873,326, filed in the name of Mazzoni et al on Jan. 30, 1978 and entitled MULTIPLE GLAZED UNIT HAVING AN ADHESIVE CLEAT, now U.S. Pat. No. 4,193,236 which teachings are hereby incorporated by reference. The peripheral edge portions of the units had a layer or film 24 of Rhoplex AC-490 acrylic emulsion polymer conveniently painted thereon.

Figure 3:
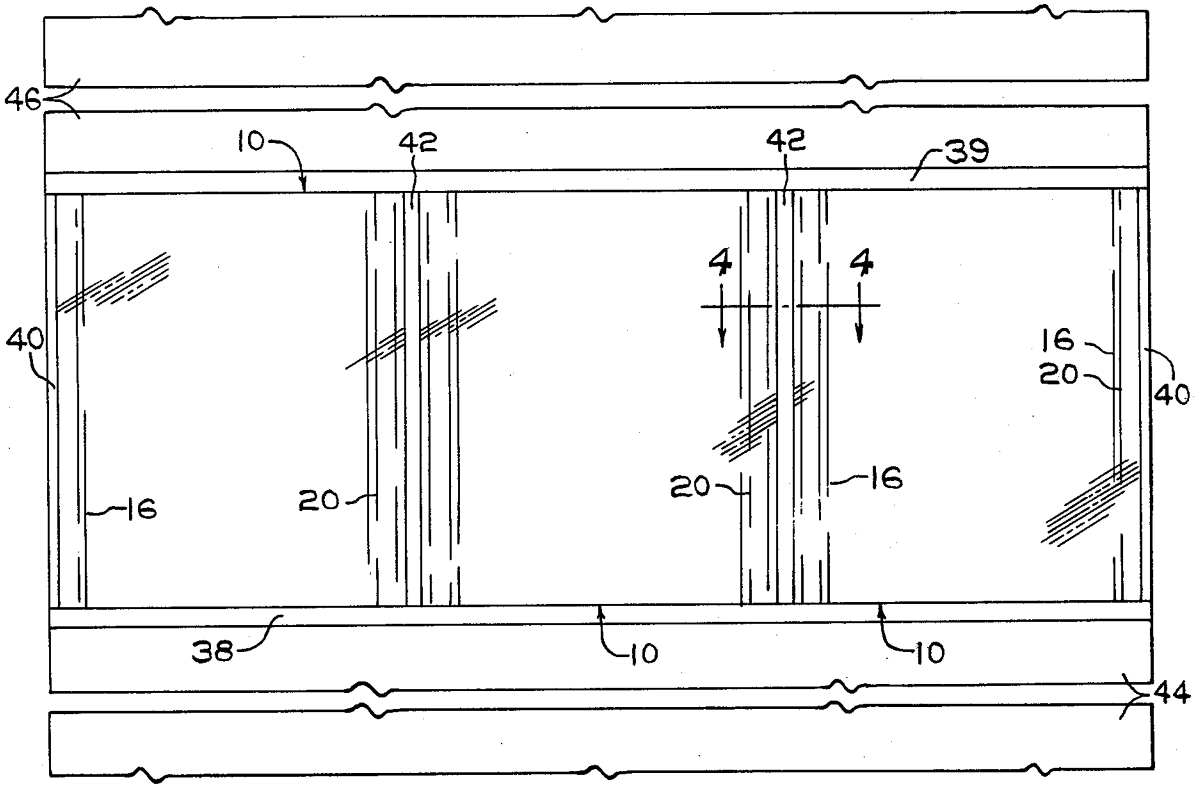
FIG. 3 is a front elevated view of a curtainwall system incorporating features of the present invention.

The units were mounted in position using a glazing system of the type taught in Architectural Glass Products dated January 1979, Section 8.26/TP and identified as PPG's EFG 401 system. The mounting of the glazed units 10 adjacent one another is shown in FIGS. 3 and 4. The multiple glazed units 10 have their peripheral edges spaced about ⅜ inch (1 cm) apart and spaced from mullion 30 by an ethafoam breaker or spacer block 36. After the units 10 are secured in position by sill gutter member 38, head member 39, and jam members 40 (shown in FIG. 3), the space between the mullion 30 and marginal edge portions of the glass sheets were filled with a layer 32 of Dow Corning 781 silicone elastomer adhesive, and the space between the peripheral edge portions of the multiple glazed units 10 was filled

TABLE II

PARTICULARS OF THE LAP SHEAR TEST

| Sample Number | Primer | Silicone Elastomer Adhesive | Tensile Value lbs./sq. inch | Average Tensiles lbs./sq. inch | Type of Failure | Comments |
|---|---|---|---|---|---|---|
| 1a | None | Dow Corning 781 | 99 | | Cohesive | All failures were cohesive failure. Samples 1 were the |
| 1b | None | Dow Corning 781 | 113 | | Cohesive | control samples. |
| 1c | None | Dow Corning 781 | 111 | 107.66 | Cohesive | |
| 2a | Hycar 2601[1] | Dow Corning 781 | 47.5 | | Adhesive | All failures were adhesive failures at the interface |
| 2b | Hycar 2601[1] | Dow Corning 781 | 50.3 | | Adhesive | between the primer coating and the glass. |
| 2c | Hycar 2601[1] | Dow Corning 781 | 47 | 48.26 | Adhesive | |
| 3a | Elvace 1875[2] | Dow Corning 781 | 111 | | Cohesive | All failures were cohesive failures. |
| 3b | Elvace 1875[2] | Dow Corning 781 | 107 | | Cohesive | |
| 3c | Elvace 1875[2] | Dow Corning 781 | 105 | 107.66 | Cohesive | |
| 4a | Rhoplex AC490[3] | Dow Corning 781 | 92 | | Adhesive/Cohesive | Approximately 95% of the failure was adhesive separation between the |
| 4b | Rhoplex AC490[3] | Dow Corning 781 | 116 | | Adhesive/Cohesive | interface of the primer coating and the glass and the remaining 5% |
| 4c | Rhoplex AC490[3] | Dow Corning 781 | 115 | 107.66 | Adhesive/Cohesive | of the failure was cohesive. |
| 5a | Polymeric VB711[4] | Dow Corning 781 | 121 | | Cohesive | |
| 5b | Polymeric VB711[4] | Dow Corning 781 | 92 | | Cohesive | 100% Cohesive failures. |
| 5c | Polymeric VB711[4] | Dow Corning 781 | 100 | 104.33 | Cohesive | |

[1]Hycar 2601 is the tradename for an acrylic latex sold by B. F. Goodrich Company
[2]Elvace is the tradename for an ethylene acetate copolymer sold by E. I. duPont DeNemours & Co., Inc.
[3]Rhoplex AC490 is the trademark for an acrylic emulsion polymer sold by Rohm and Haas Company
[4]Polymeric VB711 is the tradename of a hydrocarbon resin sold by Polymeric Systems, Inc.

The results, tabulated in Table II, of the lap shear test show that Elvace 1875 polymer and Polymeric VB711 polymer do not reduce the adhesive bond strength between Dow Corning 781 adhesive and glass. The Hycar 2601 polymer which had adhesive failures, substantially reduces the adhesive bond strength between Dow Corning 781 adhesive and glass. The table further shows that the Rhoplex AC-490 polymer does not appreciably reduce the adhesive bond strength between the glass and the Dow Corning 781 adhesive in that even though 95 percent of the failure was in adhesion, the adhesive failure did not occur below the average tensile stresses of the control sample, e.g., Sample 1, which is 107.66 lb./sq. inch.

with a layer of Dow Corning 781 silicone elastomer adhesive.

After the silicone cured, a blower having a capacity of 175 cubic feet/minute (4.7 cubic meters per minute) and a pressure of about 16 ounces was operatively connected to the housing to supply a reversible flow of air that could provide either positive or negative pressure within the test chamber. Deflection gauges were mounted at the center of the inner light of the middle unit; at the center of the outer light of the middle unit; at the vertical mid-point of the left and right edges of the outer light of the middle unit and at the middle of the left mullion, as viewed in FIG. 3. The blower (not shown) was energized to exhaust air from the housing to apply a positive wind load pressure in pounds per square foot of +10, +20, +30 and in kilograms per square meter (KSM) of +49, +98, +145 respectively and thereafter reversed to apply negative wind load pressure of −10, −20, −30, −40, −50 and −55 p.s.f. (−49, −98, −145, −196, −245, and −269 KSM). Values above −55 p.s.f. (−269 KSM) could not be tested because a portion of the chamber collapsed, breaking the air-tight seal. The pressure was applied in steps from zero to the designated wind load pressure value. Deflection gauge readings were taken at each loading up to the maximum positive loading and to the maximum negative loading. Shown in Table III are the deflection readings.

TABLE III

| Particulars of Wind Load Test | | |
|---|---|---|
| Location | Maximum Deflection at Positive Loading in inches (centimeters) | Maximum Deflection at Negative Loading in inches (centimeters) |
| Center of inner light (middle unit) | −0.702 (−1.78) | +1.171 (+2.92) |
| Center of outer light (middle unit) | −0.438 (−1.10) | +0.670 (+1.67) |
| Silicone Joint (average of two readings) | −0.042 (−.15) | +0.070 (+1.5) |
| Left mullion at middle | −0.434 (−1.10) | +0.577 (+1.4) |

The results of Test IX show that the instant invention provides a weatherseal between peripheral edge portions of adjacent multiple glazed units of sufficient strength to withstand positive wind load pressure of at least 30 30 pounds/sq. foot (145 kg/m$^2$) and negative wind load pressure at least −55 pounds/sq. foot (−264 kg/m$^2$).

TEXT X

Four multiple glazed units were installed as the front wall in a sturdy air pressure chamber for testing similar to that of Test IX. Two of the multiple glazed units were similar to those of Test IX but had a height of about 93-3/16 inches (2.33 meters), a width of about 71⅝ inches (1.79 meters) and a thickness of about 1 inch (2.54 centimeters). A silicone cleat between the primary and secondary seal was conveniently applied around the peripheral channel of each unit about 2 inches (5.08 centimeters) short of the corners. As in Test IX, the peripheral edge portions of the two units were primed with Rhoplex AC-490 polymer.

The other two multiple glazed units employed in the curtainwall system were also of similar dimension and were fabricated as illustrated in FIGS. 1 and 2 but differed from the previously described two units of Test X, in that GE 3204 silicone adhesive was used as the secondary sealant within the peripheral channel, rather than the above employed Fuller HM 1081 hot melt butyl sealant. Further, a silicone cleat between the primary and secondary seal was not employed in the peripheral channel and the peripheral edge portions of the two units were not primed.

GE 1200 silicone elastomer adhesive was used to mount the four multiple glazed units into the curtainwall system, afterwhich the system was subjected to air infiltration tests, static water penetration tests of 6 p.s.f. (29.4 KSM) for 12 minutes and dynamic water penetration tests at 6 p.s.f. (29.4 KSM) according to National Association of Architectural Metal Manufacturers Interim Standard TM-1-68T. Visual observation indicated that there were no water leaks in the curtainwall system. The curtainwall system ws thereafter tested as in Test IX between positive wind loading of +45 p.s.f. (+217 kg/m$^2$) to negative wind loading of −45 p.s.f. (−217 kg/m$^2$). Visual observation failed to detect any seal failure.

An add-on chamber was positioned on the opposite side of the curtainwall system, to subject the units to a negative wind load pressure exerted upon the exterior glass lights of the multiple glazed units. At −45 p.s.f. (−217 kg/m$^2$) the exterior lights of both unprimed multiple glazed units separated from their respective spacers causing system failure. After sealing off the failed units, the primed multiple glazed units were further tested to about −100 p.s.f. (−490 kg/m$^2$). No seal rupture was visually observed, however, the mullion was permanently deformed at its midspan.

As can now be appreciated, the invention is not limited to the described specific embodiments and the examples are presented for illustration purposes only. For example, the invention may be practiced on multiple glazed units having more than two sheets.

I claim:

1. A multiple glazed unit having a pair of sheets, means for spacing said sheets from one another to provide a space therebetween, and means for sealing said space, said sealing means including an organic elastomer having an exposed surface which is to be adhered to a structural member through the interposition and curing of a silicone elastomer adhesive, wherein the improvement comprises:

a layer of a primer dried on at least said exposed surface of said organic elastomer, the primer selected to improve adhesion between said organic elastomer and said interposed and cured silicone elastomer adhesive, wherein the primer is a material selected from the group consisting of acrylic latex polymers, acrylic emulsion polymers, ethylene copolymers, and hydrocarbon resin emulsion polymers.

2. The multiple glazed unit as set forth in claim 1 wherein said spacing means includes a spacer positioned between marginal edge portions of adjacent sheets and spaced from peripheral edge portions to provide a peripheral channel about said unit; and said organic elastomer disposed in said channel.

3. The multiple glazed unit as set forth in claims 1 or 2 wherein the organic elastomer is hot melt butyl sealant.

4. A method of mounting a multiple glazed unit to a rigid member, said multiple glazed unit having an exposed surface of an organic elastomer, including the step of securing said exposed surface to said rigid member by the interposition and curing of a silicone elastomer adhesive, wherein the improvement comprises the steps of:

applying a layer of a primer to at least said exposed surface of said organic elastomer, wherein the primer is a material selected from the group consisting of acrylic latex polymers, acrylic emulsion polymers, ethylene copolymers, and hydrocarbon resin emulsion polymers, said primer selected to improve adhesion between said organic elastomer and said interposed and cured silicone elastomer adhesive;

drying said layer of primer; and practicing said applying and drying steps prior to practicing said securing step.

5. The method as set forth in claim 4 wherein the rigid member is an additional multiple glazed unit and the multiple glazed units have peripheral edge portions adjacent one another.

6. The method as set forth in claim 4 wherein the rigid member is a peripheral edge portion of a fenestration.

7. The method as set forth in claim 4 wherein the rigid member is a vertical or horizontal member of a curtainwall system.

8. The method as set forth in claim 4 wherein the multiple glazed unit comprises:

a spacer means;

at least two sheets spaced from one another by said spacer means positioned between adjacent sheets to provide a space therebetween, and to provide a peripheral channel about the unit; and said organic elastomer in said channel to maintain adjacent sheets about said spacer means, and to seal said space.

9. The method as set forth in claim 6 wherein the organic elastomer is hot melt butyl sealant.

10. A method of adhering an organic elastomer to a silicone elastomer adhesive wherein the bond between said organic elastomer and said silicone elastomer adhesive fails adhesively when said elastomers are directly adhered together and subjected to a peel test, comprising:

applying a primer to the surface of the organic elastomer, said primer selected to cause a cohesive failure between said organic elastomer and said silicone elastomer adhesive when subjected to a peel test, wherein the primer is a material selected from the group consisting of acrylic latex polymers, acrylic emulsion polymers, ethylene copolymers, and hydrocarbon resin emulsion polymers;

drying said primer;

applying an uncured silicone elastomer adhesive to the primed surface of said organic elastomer; and curing the silicone elastomer adhesive.

11. The method as set forth in claim 10 wherein the organic elastomer is a hot melt butyl sealant.

12. In a curtainwall glazing system of the type having at least two rigid members; a plurality of multiple glazed units, said units each comprising a pair of sheets, means for spacing said sheets from one another to provide a space therebetween, and means for sealing said space, said sealing means including an organic elastomer having an exposed surface at the periphery of said unit; and a cured silicone elastomer adhesive adhering said units to said rigid members and adhering adjacent peripheral edges of said units together, wherein the improvement comprises:

a layer of a primer dried on at least said exposed surface of said organic elastomer, the primer selected to improve adhesion between said organic elastomer and said cured silicone elastomer adhesive, wherein the primer is a material selected from the group consisting of acrylic latex polymers, acrylic emulsion polymers, ethylene copolymers, and hydrocarbon resin emulsion polymers.

13. The apparatus as set forth in claim 12 wherein said rigid members are the peripheral edge portions of a fenestration.

14. The apparatus as set forth in claim 12 wherein said rigid members are vertical mullions.

15. The apparatus as set forth in claim 12 wherein said rigid members are horizontal transoms.

* * * * *